Figure 3:
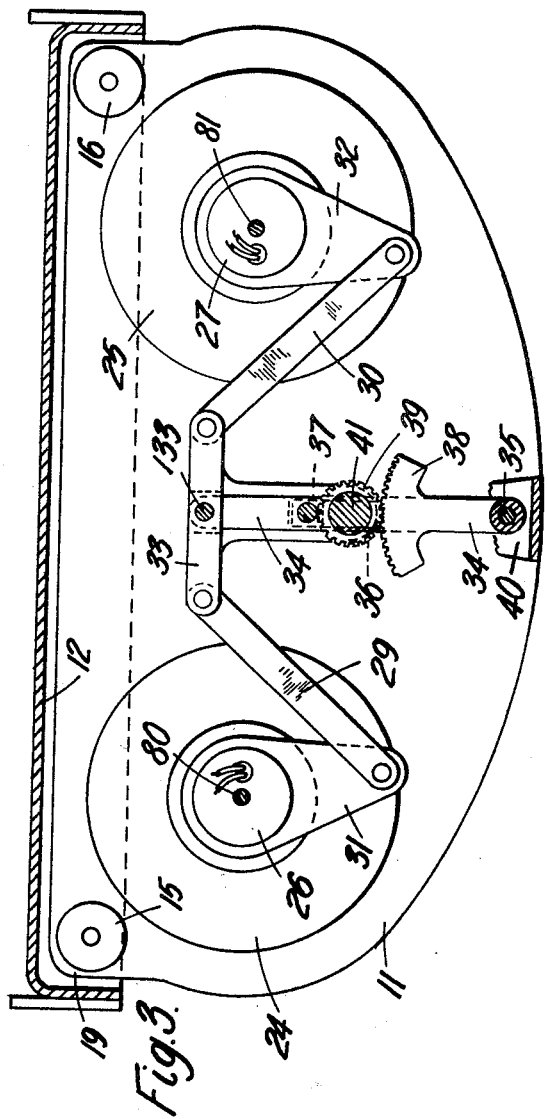

May 4, 1965   C. GOODACRE ETAL   3,181,640
INDUSTRIAL TRUCKS
Filed April 10, 1963   4 Sheets-Sheet 1
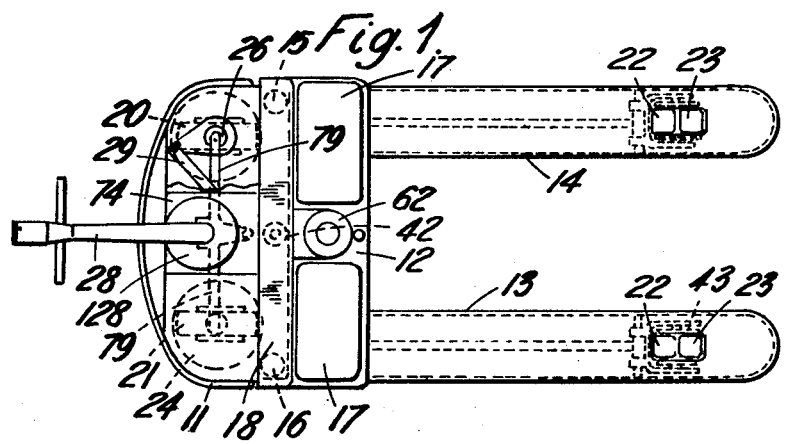
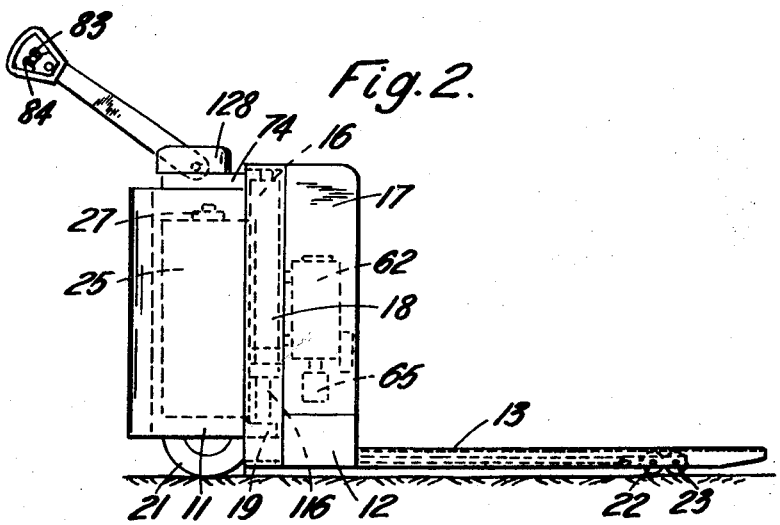
INVENTORS
Cecil Goodacre
John R. V. Dolphin
By E. T. Ledgater
ATTORNEY May 4, 1965 C. GOODACRE ETAL 3,181,640
INDUSTRIAL TRUCKS
Filed April 10, 1963 4 Sheets-Sheet 2

INVENTORS
Cecil Goodacre
John R. V. Dolphin
By
E. T. LeGates
ATTORNEY

May 4, 1965   C. GOODACRE ETAL   3,181,640
INDUSTRIAL TRUCKS
Filed April 10, 1963   4 Sheets-Sheet 3
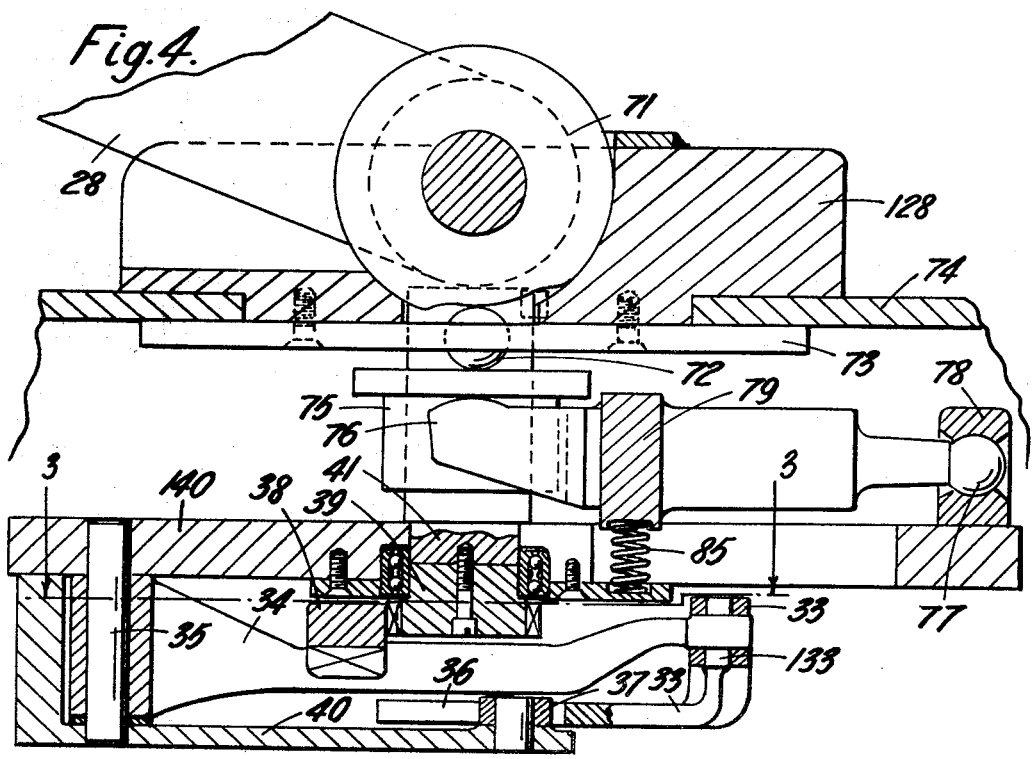
INVENTORS
Cecil Goodacre
John R. V. Dolphin
By E. J. LaGates
ATTORNEY

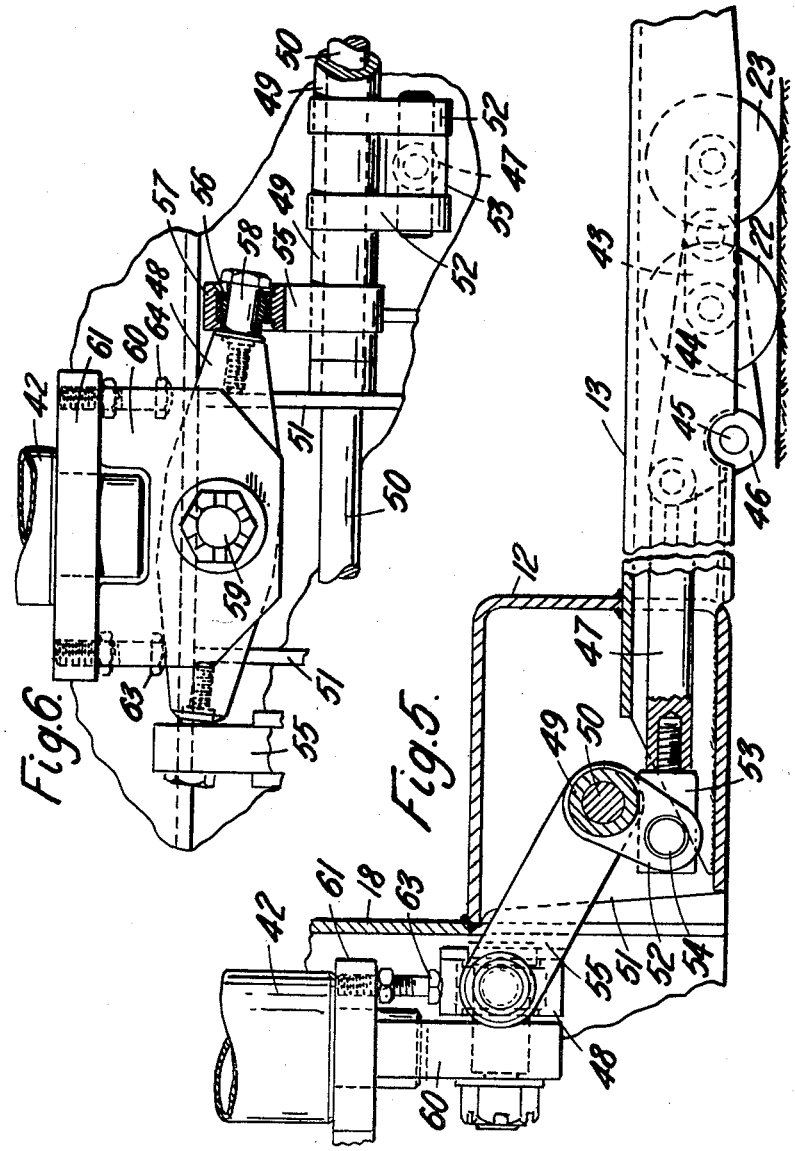

United States Patent Office 3,181,640
Patented May 4, 1965

3,181,640
INDUSTRIAL TRUCKS
Cecil Goodacre and John Robert Vernon Dolphin, Basingstoke, England, assignors to Lansing Bagnall Limited, Basingstoke, England, a British company
Filed Apr. 10, 1963, Ser. No. 272,133
Claims priority, application Great Britain, May 12, 1962, 14,276/62
5 Claims. (Cl. 180—19)

The invention relates to industrial trucks.

Pedestrian operated pallet and stillage trucks are normally provided with three wheels, one driving wheel at the forward end and two wheels one each side of the centre line near the end of the forks or load platforms. Having only three wheels, these all remain on the ground at all times although they are rigidly connected to the truck. However, such a truck, having a high centre of gravity due partly to an electric traction motor above the driving wheel and partly a heavy electric storage battery which extends well above the ground is unstable when operated on sloping or moving surfaces such as the decks of ships. Such instability may be accentuated by a high load or by a load positioned on one side of the truck.

Castor wheels one at each side of the driving wheel have been used as an aid to stability, but these must either be mounted resiliently or just clear of the ground so that they cannot lift the driving wheel off the ground when the truck is passing over uneven ground so that such castor wheels do not solve the problem satisfactorily for use such as on the deck of a ship.

According to the invention an industrial truck has forks or a load platform, means for raising and lowering the root portion of the forks or load platform relatively to another part of the truck which has its own wheels resting on the ground, two wheeled ground-supports at the outer end of the forks or load platform, and a linkage for each ground-support to raise and lower the outer end of the load platform and forks relatively to the ground-supports when the root portion is raised or lowered, said linkage including means whereby the ground-support at one side of the fork or load platform structure can be further raised or lowered relatively to the structure and the ground-support on the other side respectively lowered or raised, when the truck is moved on to uneven ground.

Preferably the means whereby the ground-support at one side of the fork or load platform structure can be raised when that on the other side is lowered comprises a balance lever extending between the linkages for raising and lowering each ground-support which balance lever permits said further movement and also serves as an operating member for lifting or lowering both sides of the forks or platform simultaneously.

Preferably each wheel of said other part of the truck is mounted in a steerably mounted driving unit containing an electric motor for that ground wheel, the electric motors being interconnected for differential action.

Preferably the two driving units are linked by a steering linkage to a steering member (for example a tiller).

The following is a description, by way of example, of an industrial truck in accordance with the invention.

In the accompanying drawings:
FIGURE 1 is a plan of a truck;
FIGURE 2 is a side elevation;
FIGURE 3 is a plan to a larger scale of the steering mechanism;
FIGURE 4 is a section through the tiller, brake gear and steering mechanism substantially on the centre line of the truck;
FIGURE 5 is a section through the root end of one of the fork arms, with the roller-supported end shown in elevation; and
FIGURE 6 is a rear elevation of the parts shown in FIGURE 5, as seen from the left-hand side of that figure.

The industrial pallet truck shown in the drawings comprises an upstanding body 11 and a battery support 12 having two forks 13, 14 extending forwardly therefrom. On the battery support are two battery boxes 17. The battery support 12 and forks 13, 14 are mounted as a unit for sliding movement up and down on the rams 116 of two jacks 15, 16 mounted one on each side within the upstanding body 11. The jack bodies 15, 16 are fixed to an upstanding back portion 18 of the battery support and the rams 116 bear on lugs 19 on the upstanding body 11 to cause movement in a vertical plane parallel to the longitudinal axis of the truck. The truck is supported on two driving wheels 20, 21 placed one at each side of the upstanding body and by two pairs of trail wheels, one pair 22, 23 on each fork 13 and 14 near the outer ends of the forks.

The driving wheels are each carried on a driving unit, the units being marked 24, 25 on the drawings, see particularly FIGURE 3. Each unit comprises a wheel mounting, an electric motor above the wheel mounting and a chain drive from the motor to the driving wheel all located in a cylindrical casing and constructed as described in British Patent No. 780,487. The motors of the two units may be connected in series with each other. In effect each of the wheels 20, 21 is independently driven and therefore can operate at different speeds when going round a curve. The cylindrical casings of both driving units are secured within the body 11 (and as shown in the above-mentioned prior patent) they have at the top steering rotors 26, 27 by which the frames within their casings which carry the motors and the ground wheels 20, 21 can be rotated.

A steering linkage shown in FIGURES 3 and 4 ensures correct relative steering movement of both driving wheels through a wide lock. This is connected to a steering tiller 28 which is mounted on a rotatable block 128. The steering linkage (in the position it assumes in the straight ahead position as shown in FIGURE 3) comprises two track rods 29, 30 pivoted to arms 31, 32 on the rotors 26, 27 of the driving units. The track rods 29, 30 extend across the line joining the vertical axes of the units 24, 25 and towards the centre of the truck. They are both connected to an intermediate link 33 which link is pivoted at 133 on a swinging arm 34 which extends forward along the longitudinal axis of the truck from a pivot 35 on a bracket 40 secured to the upstanding body 11. The intermediate link 33 is T-shaped and the leg of the T extends below the arm 34. It has a slot 36 along its centre line which engages a rectangular block 37 as a sliding fit. The rectangular block is pivotally mounted on the bracket 40. A curved rack 38 mounted on the swinging arm 34 is engaged with a pinion 39 which is pivotally mounted beneath a bracket arm 140 on the bracket 40. The block 128 which carries the tiller 28 is keyed to the spindle 41 of the pinion. Steering movements of the driving units are effected by movements of the tiller 28 which rotates the pinion 39 and so moves the swinging arm 34 and carries the intermediate link 33 across the centre line of the truck. This causes the track rods 29, 30 to steer the driving units. It will be noted that the intermediate link 33 has to swing around the pivoted block 37 when it is carried across the truck by the steering movements of the tiller arm and this mechanism enables the wheels to swing through a very wide lock angle with accuracy. The movement of the tiller arm 28 is so geared to the steering mechanism of the driving units that the tiller is directionally aligned with the position of the wheels and the truck follows the direction in which the operator sets the tiller arm in any path of travel.

The driving units 24, 25 have, in the centre of their steering rotors 26, 27, brake-operating rods 80, 81, as described in the aforesaid patent and it is necessary for the tiller arm 28 to be able to operate these rods equally, when it is moved up or down on its pivot in the rotary block 128, whatever the position of rotation of the tiller may be. To this end, at one side of the hub of the tiller arm 28 there is secured a cam 71, FIGURE 4, which bears on a ball 72 capable of sliding up or down in a hole in which it fits, in a plate 73 secured to the underside of the rotary block 128. The plate 73 also holds the rotary block in the top plate 74 of the body 11. The ball 72 is located close to one side of the spindle 41 of the gear 39 and around the spindle is a sliding collar 75 on which the ball 72 bears. A forked lever 76 engages beneath the collar and the other end of the lever is pivoted universally in a ball joint 77 carried in a socket 78 on the bracket-arm 140. The lever 76 is urged upwardly by a spring 85 and has two cross-arms 79, which extend one to each side and terminate over the brake-rods 80, 81. The ball-joint 77 enables the cross-arms 79 of the lever to bear equally on the two brake rods when it is depressed against the action of spring 85 by the cam 71 on the tiller and the cam is shaped so that if the tiller arm 28 is brought down to a fully horizontal position it will put on the brakes. Also if it is moved to a vertical position it will apply them. At a range of intermediate positions the brakes are freed and a switch button 83 on the tiller arm is connected to the motors to apply power to them for propulsion of the truck. The electrical connections from a tiller arm on a truck are well-known and do not require further description.

As already explained, the hydraulic jacks 15, 16 connected between the upstanding body 11 and the battery support 12 are capable of raising the forks 13, 14 and battery support 12 with respect to the body 11. The jacks may be operated by electromagnetic valves connected to a push button 84 on the tiller arm 28. Each pair of trail wheels 22, 23 at the outer end of each fork 13 or 14 is carried on a roller carriage 43, FIGURE 5, the centre of which is supported on a bell crank lever 44 pivoted by a pin 45 in bearings 46 secured to the fork. The bell crank lever 44 is operated by a push rod 47 within the fork which push rod extends as far as the battery support 12. Operation of the push rod causes the bell crank lever 44 to swing about its pivotal mounting and lower the roller carriage 43 and trail wheels 22, 23 with respect to the fork. As the trail wheels are resting on the ground this movement serves to lift the outer ends of the forks. The push rod 47 is operated by movement of the hydraulic jacks through a balance lever 48 as hereinafter described, so that when the battery support and the inner end of the forks are raised by the jacks 15, 16, the trail wheels 22, 23 are operated to raise the outer end of the forks to maintain them substantially horizontal.

The mechanism to raise and lower the trail wheels comprises two tubular shafts 49 (of which one only appears in FIGURES 5 and 6, but it is duplicated below the other end of balance lever 48) pivoted on a rod 50 which is mounted across the battery support 12 near the roots of the forks and is supported at its centre by web-plates 51. Each tubular shaft has near its outer end two parallel crank webs 52 which project downwardly and away from the forks with the forks in the lowered position. An eye 53 at the end of each push-rod 47 is pivoted on a crank pin 54 which is mounted in the parallel crank webs 52. A lever 55 is rigidly attached to each tubular shaft 49 near its inner end. These levers extend upwardly and away from the forks when the forks are in the lowered position. The balance lever 48 is connected between the upper ends of the levers 55 by ball and socket joints 56, 57 which work on pins 58 on the ends of the balance lever. The balance lever 48 is pivotally mounted at 59 by means of a ball and socket joint to a head 60 below a fluid storage tank 42. The head 60 is mounted below a bracket 61 secured to the upstanding body 11. The two adjustable screw stops 63, 64 are provided on the bracket 61 to limit the movement of the balance lever 28. Hydraulic power is supplied by a motor 62 located between the battery boxes 17 and operating a pump 65 which draws from the tank 42.

In operation, to raise the forks from the lowered position, the pump 65 is operated to supply fluid to the hydraulic jacks 15, 16 to cause them to lift the battery support 18, 12. Thus the battery support and pivot 50 of levers 55 moves upwardly relatively to the body 11 and balance lever 48. This causes the push-rods 47 to lower the trail wheels 22, 23. Thus the trail wheels are operated to raise the outer end of the forks whenever the hydraulic jack 42 is operated to raise the battery support.

When the truck is operated over uneven ground in such a way that the points on the ground directly below the driving wheels and the rollers are not co-planar, one of the sets of trail wheels must rise relatively to the other to maintain all the wheels on the ground. The linkage for raising and lowering the trail wheels operates as follows to allow one set of trail wheels to rise or fall relatively to the other. When one set of trail wheels 22, 23 rests on elevated ground that set of trail wheels rises relatively to the fork 13 or 14 and causes the associated bell crank lever 44 to rotate about its pivot and operate the corresponding push rod 47. This push rod causes the associated crank webs 52 to rotate the tubular shaft 49 and thus move the corresponding lever 55. Movement of this lever swings the balance lever 48 and causes an equal movement in the opposite direction in the other lever 55 at the other end of the balance lever. This movement of the lever is relayed through the linkage associated with the other pair of trail wheels 22, 23 and causes these trail wheels to be lowered. Thus one set of trail wheels 22, 23, if elevated by the rise of the ground without using the jacks 15, 16, moves relatively to the other set of trail wheels, and compensates for the uneven ground without tilting the truck. A similar movement of the mechanism occurs if one of the driving wheels 20, 21 encounters elevated or lowered ground, and so all four points of support remain on the ground when the truck passes over uneven ground.

The invention is not limited to the details of the above description. For example the truck could be a stillage truck, with a platform instead of the forks 13, 14.

We claim:

1. In an industrial truck the combination of a body portion of the truck, wheels beneath the body portion which are spaced apart laterally, a load-carrier device having a root portion attached to the body portion by means which permit up and down movement relative thereto, the remainder of the load carrier device extending away from the body portion near ground level, means for raising and lowering the said root portion of the load carrier relatively to the body portion, two wheeled ground supports spaced apart laterally at the outer part of the load carrier, levers on the load carrier to which the ground supports are attached to raise and lower the outer ends of the load-carrier relatively to the ground-supports when the root portion is raised and lowered, a transverse balance-lever on the body portion of the truck and pivoted thereto between its ends, and linkage means on the load carrier extending between the said levers on the load carrier and the ends of the balance-lever whereby either side of the load-carrier can be further altered in height relatively to the ground support at the other side of the load-carrier when the truck is moved on to uneven ground.

2. A truck as claimed in claim 1 wherein an upright back member rigidly connected to the load-carrier is vertically movable relatively to the body and its driving wheels and wherein two jacks, one at each side of the truck extend up and down between the body and the load-carrier and serve to effect the relative movement.

3. An industrial truck having the features set forth in claim 1, wherein each wheel of said body portion of the truck is mounted in a steerably mounted driving unit containing an electric motor for that ground wheel, the electric motors driving each of said ground wheels independently.

4. An industrial truck as claimed in claim 3, wherein the two driving units are linked by a steering linkage to a steering member.

5. An industrial truck as claimed in claim 4, wherein the steering member is a tiller, the tiller is mounted so as to be capable of being raised and lowered, there is a brake-operating member on the body, and there is provided means whereby when the tiller is moved in the up and down direction to a particular position it actuates the brake-operating member, the brake-operating member being mounted so as to be capable of a balancing movement and applying equal or nearly equal force to brake members on each of the steerably mounted driving units.

References Cited by the Examiner

UNITED STATES PATENTS

| | | | |
|---|---|---|---|
| 1,331,198 | 2/20 | Hennessy et al. | 180—65 X |
| 1,368,892 | 2/21 | Carr | 180—65 X |
| 2,651,379 | 9/53 | Elliott et al. | 180—12 |
| 2,913,063 | 11/59 | Brown | 180—65 X |
| 3,057,426 | 1/62 | Hastings | 180—65 X |

FOREIGN PATENTS

| | | |
|---|---|---|
| 174,279 | 2/61 | Great Britain. |
| 780,487 | 8/57 | Great Britain. |
| 852,617 | 10/60 | Great Britain. |

A. HARRY LEVY, *Primary Examiner.*